(12) United States Patent
Morita

(10) Patent No.: US 8,127,406 B2
(45) Date of Patent: Mar. 6, 2012

(54) HOSE CLAMP

(75) Inventor: Naoki Morita, Yokohama (JP)

(73) Assignee: Piolax Inc., Yokohama-Shi (JP)

( * ) Notice: Subject to any disclaimer, the term of this patent is extended or adjusted under 35 U.S.C. 154(b) by 608 days.

(21) Appl. No.: 12/293,421

(22) PCT Filed: Oct. 27, 2006

(86) PCT No.: PCT/JP2006/321511
§ 371 (c)(1),
(2), (4) Date: Sep. 17, 2008

(87) PCT Pub. No.: WO2007/108155
PCT Pub. Date: Sep. 27, 2007

(65) Prior Publication Data
US 2009/0049656 A1    Feb. 26, 2009

(30) Foreign Application Priority Data
Mar. 17, 2006  (JP) ................. 2006-075568

(51) Int. Cl.
*F16L 33/02*  (2006.01)
*B65D 63/00*  (2006.01)

(52) U.S. Cl. ................. 24/20 R; 24/20 EE; 24/23 R

(58) Field of Classification Search ............ 24/23 R, 24/23 W, 20 CW, 20 S, 20 R, 22, 20 TT
See application file for complete search history.

(56) References Cited

U.S. PATENT DOCUMENTS 4,996,749 A * 3/1991 Takahashi ............ 24/20 R
5,414,905 A * 5/1995 Kimura et al. ........ 24/20 R
5,542,155 A    8/1996 Kimura et al.
5,855,044 A * 1/1999 Cradduck ............ 24/20 R
(Continued)

FOREIGN PATENT DOCUMENTS
JP    03-096489 U    10/1991
(Continued)

OTHER PUBLICATIONS

English Language International Search Report dated Nov. 21, 2006 issued in parent Appln. No. PCT/JP2006/321511.

*Primary Examiner* — Robert J Sandy
*Assistant Examiner* — Michael Lee
(74) *Attorney, Agent, or Firm* — Holtz, Holtz, Goodman & Chick, PC

(57) ABSTRACT

Provided is a hose clamp which is capable of reliably fastening and fixing a hose to a pipe without being affected by a layout of the hose to be fastened. The hose clamp (10) has an annular plate spring body (11), a slit (15) and a first tab (18) are formed at one end of the plate spring body (11), and an insertion section (23) and a second tab (25) are formed at another end. An engagement section (21) engaged with an opposite surface of the second tab (25) is formed at the first tab (18), and an operation section (29) extending in a width direction to be situated above the engagement section (21) is formed at the second tab (25). The engagement between the engagement section (21) and a groove (31) can be released by vertically moving the engagement section (21) and the operation section (29) away from each other by a flat head screwdriver (D) or by bringing the operation section (29) and the first tab (18) close to each other in the width direction by a plier (T).

20 Claims, 12 Drawing Sheets

U.S. PATENT DOCUMENTS

| | | | |
|---|---|---|---|
| 6,098,251 A * | 8/2000 | Zielinski | 24/20 R |
| 6,192,555 B1 * | 2/2001 | Nakamura et al. | 24/20 R |
| 6,343,407 B1 * | 2/2002 | Muto et al. | 24/20 R |
| 6,438,801 B1 * | 8/2002 | Yamada | 24/20 R |

FOREIGN PATENT DOCUMENTS

| | | |
|---|---|---|
| JP | 5-83580 U | 11/1993 |
| JP | 6-69581 U | 9/1994 |
| JP | 10-061855 A | 3/1998 |
| JP | 2000-297893 A | 10/2000 |
| JP | 2001-090886 A | 4/2001 |
| JP | 2001-159491 A | 6/2001 |
| JP | 2001-280566 A | 10/2001 |
| JP | 2003-090474 A | 3/2003 |

* cited by examiner

HOSE CLAMP

This application is a U.S. National Phase Application under 35 USC 371 of International Application PCT/JP2006/321511 filed Oct. 27, 2006.

TECHNICAL FIELD

The present invention relates to a hose clamp used when connecting together, for example, pipes of automotive inner piping by means of a hose.

BACKGROUND ART

Conventionally, when connecting pipes for automotive inner piping to each other, there has been widely adopted a method in which a flexible hose is placed on the outer peripheries of the pipe end portions, and in which the outer periphery of the hose is tightened by a hose clamp, thereby fixing the hose to the pipes.

As an example of such a hose clamp, Patent Document 1 discloses a hose clamp which includes a C-shaped fastening ring and a pair of grips (tabs) crossing each other from both ends of the fastening ring and radially erect, with one grip having an guide groove opening and a large width dimension in an arch-like configuration, the other grip having a small width dimension allowing movement in the guide groove; accordingly, when the fastening ring is reduced in diameter in a free state, fastening of the hose is possible, and when the pair of grips are brought close to each other, the fastening ring is increased in diameter, wherein at a groove edge of the guide groove near one grip, there is provided an engagement section to be detachably engaged with the other grip, and wherein, at the groove edge of the guide groove continuous with the engagement section, there is provided a guide section for guiding the other grip in the direction of the opening of the guide groove.

Patent Document 2 discloses a hose clip having an annularly curved plate spring body capable of elastic bending deformation, the plate spring body having at one end thereof a slot hole and a first tab outwardly protruding on the forward end side of the slot hole, the plate spring body having at the other end thereof an insertion section to be inserted into the slot hole and a second tab outwardly protruding at the forward end of the insertion section, wherein the insertion section is equipped with an outwardly protruding engagement claw and a slope situated on the one side of the second tab with respect to the engagement claw and outwardly protruding as it comes closer to the second tab, wherein, on the one side of the first tab, there are provided a sliding section sliding on the slope and an engagement section to be engaged with the engagement claw for temporary fixation, and wherein the slope and the sliding section are constructed such that, when the plate spring body being widened with the first and second tabs being held thereby, the sliding section being situated near the lower side of the slope, and when the first and second tabs being released in this state, the engagement section is engaged with the engagement claw for temporary fixation, and that, when the first and second tabs in the temporary fixation state being further brought closer to each other, the sliding section is guided by the slope to cause the first tab to be pushed radially outwards.

Further, Patent Document 3 discloses a hose clamp which includes a C-shaped fastening ring and a pair of grips (tabs) crossing each other from both ends of the fastening ring and radially erect, with one grip having an guide groove opening and a large width dimension in an arch-like configuration, the other grip having a small width dimension allowing movement in the guide groove; accordingly, when the fastening ring is reduced in diameter in a free state, fastening of the hose is possible, and when the pair of grips are brought close to each other, the fastening ring is increased in diameter, wherein there is formed at one side edge of one grip a receiving wall extending inwardly, wherein there is formed at one side edge of the other grip an operation section protruding in the width direction from one side edge of the one grip in a state where the fastening ring is increased in diameter, and wherein there is formed on the fastening ring near the other grip an engagement section to be engaged with the receiving wall.

Patent Document 1: JP 2001-159491 A
Patent Document 2: JP 3280341 B
Patent Document 3: JP 2001-90886 A

DISCLOSURE OF THE INVENTION

Problem to be Solved by the Invention

In the hose clamps of Patent Documents 1 and 2, the pair of grips (tabs) are pinched by using a tool such as pliers, and are tightened so as to be brought closer to each other, thereby releasing the engagement in the increased-diameter state. In the hose clamp of Patent Document 3, the forward end of the operation section, protruding in the width direction from one side edge of one grip, and the side of the other grip, being on the side opposite to the protruding direction of the operation section, are tightened by a tool such as pliers, thereby releasing the engagement in the increased-diameter state.

However, in these hose clamps, predetermined portions of the pair of grips (tabs) are tightened by a tool such as pliers to release the engagement, and hence the direction in which the tool such as pliers is inserted is limited to some degree, resulting in a rather low degree of freedom.

Meanwhile, depending upon the layout of the pipes and the hose placed thereon, the space and direction in which the tool and the operator's hand are inserted may be limited. Then, the engagement of the grips cannot be released, making it impossible to fasten the hose.

It is accordingly an object of the present invention to provide a hose clamp making it possible to reliably fasten and fix the hose to the pipes in whatever layout the pipes and the hose may be arranged.

Means for Solving the Problems

In order to achieve the above-mentioned object, according to a first aspect of the present invention, there is provided a hose clamp including a plate spring body curved into an annular configuration, one end portion of the plate spring body having a slit formed to extend in a circumferential direction, and a first tab protruding radially outwards, another end portion of the plate spring body having an insertion section inserted into the slit and slidable within the slit in the circumferential direction, and a second tab protruding radially outwards from an end portion of the insertion section and arranged to be opposed to the first tab, such that the plate spring body is increased in diameter against a resilient force thereof when the first tab and the second tab are brought close to each other, while the plate spring body being reduced in diameter in a free state, in which the first tab has a hook-like engagement section extending toward the second tab and extending in a width direction of the plate spring body which is thereby capable of being engaged with a surface of the second tab on a side opposite to a surface opposed to the first tab, in which the second tab has an operation section extending in the width direction of the plate spring body in a predetermined length so as to be situated above the engagement section, and a stopper portion which, when the engagement section is engaged with the surface of the second tab on the side opposite to the surface opposed to the first tab, maintains an engaged state therebetween, and in which, in a free state where the plate spring body is reduced in diameter, the engagement section is situated to be deviated in the width direction with respect to the stopper portion and is thereby free from overlapping the stopper portion in the circumferential direction.

According to the above-mentioned invention, in the free state where the plate spring body is reduced in diameter, the engagement section is deviated in the width direction with respect to the stopper portion and does not overlap the stopper portion in the circumferential direction, whereas when the first tab and the second tab are brought close to each other, and the engagement section of the first tab is shifted in the width direction to be engaged with the stopper portion of the second tab, the engagement of the engagement section with the stopper portion is performed with both end portions of the plate spring body being deflected in the width direction, and the engaged state is maintained by the stopper portion.

When, in this state, the hose clamp is arranged in the outer periphery of the hose to be fastened, and the engagement section is shifted with respect to the second tab to release the engagement at the stopper portion, the plate spring body is elastically restored to the former position in the width direction, attaining a position where the engagement section and the second tab are not engaged with each other. Thus, the engagement of the engagement section and the second tab is released, and the insertion section slides in the slit due to the elastic restoring force of the plate spring body, causing the plate spring body to be reduced in diameter, and hence it is possible to fasten and fix the hose in position.

In the present invention, it is possible to release the engagement of the engagement section and the stopper portion in various ways. For example, the end portion of the operation section formed on the second tab and the end portion of the first tab on the side opposite to the operation section are pinched by pliers, and the first tab is shifted in the width direction with respect to the second tab, whereby it is possible to release the engagement of the engagement section and the stopper portion. Further, by moving the engagement section and the operation section so as to cause them to vertically move away relatively from each other by a tool such as a flat head screwdriver, it is possible to release the engagement of the engagement section and the stopper portion.

Thus, even when the space and direction in which the operator's hand and a tool can be inserted are limited due to the condition around the portion where the hose clamp is arranged, it is possible to release the engagement of the engagement section and the stopper portion when any one of the above-mentioned method can be applied, and hence the hose fastening operation can be facilitated. Further, as the tool, it is possible to use not only pliers but also a flat head screwdriver or the like, and hence it is possible to enhance the degree of freedom in terms of tool selection.

According to a second aspect of the present invention, in the first aspect of the present invention, there is provided a hose clamp in which the operation section extends to be situated above the engagement section, and in which, when the engagement section is engaged with the second tab, a gap of a predetermined dimension is formed between an upper surface of the engagement section and a lower surface of the operation section.

According to the above-mentioned invention, when the engagement section is engaged with the second tab, a gap is formed between the upper surface of the engagement section and the lower surface of the operation section, and hence, for example, by inserting the forward end of a tool with a thin and narrow distal end such as a flat head screwdriver into this gap, and by placing the shaft portion thereof on the upper edge of the first tab, and using this as a fulcrum by pushing up the operation section or down the engagement section, it is possible to release the engagement of the engagement section and the second tab easily with a relatively small force.

According to a third aspect of the present invention, in the first or second aspect of the present invention, there is provided a hose clamp in which, on a side portion of the engagement section in close proximity to the second tab, there is provided with a tapered portion formed to gradually increase a width of the engagement section from a predetermined position in an extending direction of the engagement section toward a proximal portion side thereof.

According to the above-mentioned invention, the side portion of the engagement section in close proximity to the second tab is provided with a tapered portion formed to be gradually increased in width, and hence when, with the engagement section being engaged with the stopper portion of the second tab, the first tab and the second tab are pinched by pliers or the like and brought close to each other in the circumferential direction, the second tab comes into sliding contact with the tapered portion of the engagement section to be thereby shifted in the width direction, and can be guided to a position where the second tab is adjacent to the proximal portion side of the engagement section. Next, when the pliers or the like are gradually opened to slowly reduce the diameter of the hose clamp, it is possible to allow passage of the engagement section and the second tab without engaging them with each other. Thus, after that, the pliers or the like is released, and the plate spring body is reduced in diameter, whereby it is possible to fasten the hose.

According to a fourth aspect of the present invention, in any one of the first through third aspects of the present invention, there is provided a hose clamp in which when the engagement section is engaged with the stopper portion of the second tab, the operation section protrudes in the width direction of the plate spring body beyond the first tab.

According to the above-mentioned invention, when the engagement section is engaged with the stopper portion of the second tab, the operation section protrudes in the width direction of the plate spring body beyond the first tab, and hence the protruding end portion of the operation section and the end portion of the first tab on the side opposite to the operation section can be easily pinched in the width direction by pliers or the like, making it possible to smoothly release the engagement of the engagement section and the second tab.

According to a fifth aspect of the present invention, in the first or second aspects of the present invention, there is provided a hose clamp in which apart of the first tab, in a protruding edge portion, forms a step portion of a predetermined depth, the step portion being extending in the width direction of the plate spring body.

According to the above-mentioned invention, a tool such as a flat head screwdriver or the like can be placed on the step portion formed at the protruding edge portion of the first tab while reliably positioned thereon, and hence the engagement of the engagement section and the second tab can be released in a stable and efficient manner.

According to a sixth aspect of the invention, in any one of the first through fifth aspects of the present invention, there is provided a hose clamp in which the engagement section extends from a portion of the first tab situated radially outside an outer circumference of the plate spring body.

According to the above-mentioned invention, the engagement section extends from the portion of the first tab situated radially outside the outer circumference of the plate spring body, and hence it is possible to fasten the hose, with the inner circumference of the plate spring body of the hose clamp being firmly held in intimate contact with the entire circumference of the hose to be fastened, making it possible to improve the sealing property, etc. of the connected hose.

According to a seventh aspect of the present invention, in any one of the first through sixth aspects of the present invention, there is provided a hose clamp in which the stopper portion includes a groove formed in a predetermined depth in a thickness direction of the second tab in the surface of the second tab on the side opposite to the surface opposed to the first tab, such that a forward end portion of the engagement section is inserted into the groove and engaged therewith.

According to the above-mentioned invention, when the forward end portion of the engagement section is pulled out of the groove, the plate spring body is restored to the former position in the width direction by the elastic restoring force of the plate spring body, and a position is attained where the engagement section and the tab are not engaged with each other, and hence the plate spring body can be reduced in diameter. Thus, in whatever direction the engagement section may be shifted with respect to the second tab, it is possible to release the engagement of the engagement section and the stopper portion, and hence the operation of releasing the engagement by moving the first tab and the second tab by hand or tool can be performed from various directions and various methods, thus making it possible to achieve an improvement in terms of workability.

EFFECTS OF THE INVENTION

In the hose clamp of the present invention, when the engagement section is engaged with the stopper portion, both end portions of the plate spring body are deflected in the width direction, and when, in this state, the hose clamp is arranged in the outer periphery of the hose, and the engagement section is shifted from the second tab to release the engagement with the stopper portion, the plate spring body is restored to the former position in the width direction, and a position is attained where the engagement section and the second tab are not engaged with each other, with the elastic restoring force of the plate spring body causing the insertion section to slide in the slit to reduce the diameter of the plate spring body, and hence it is possible to fasten and fix the hose in position.

In this regard, in the hose clamp of the present invention, the engagement of the engagement section and the stopper portion can be released by various methods. It can be released, for example, by pinching the end portion of the operation section and the end portion of the first tab on the side opposite to the end portion of the operation section to shift the first tab in the width direction with respect to the second tab, or by relatively moving the engagement section and the operation section vertically away from each other by a flat head screwdriver or the like, and hence even when the space or direction in which the operator's hand or the tool can be inserted is limited, the engagement of the engagement section and the stopper portion can be released reliably, thus facilitating the hose fastening operation.

Figure 1:
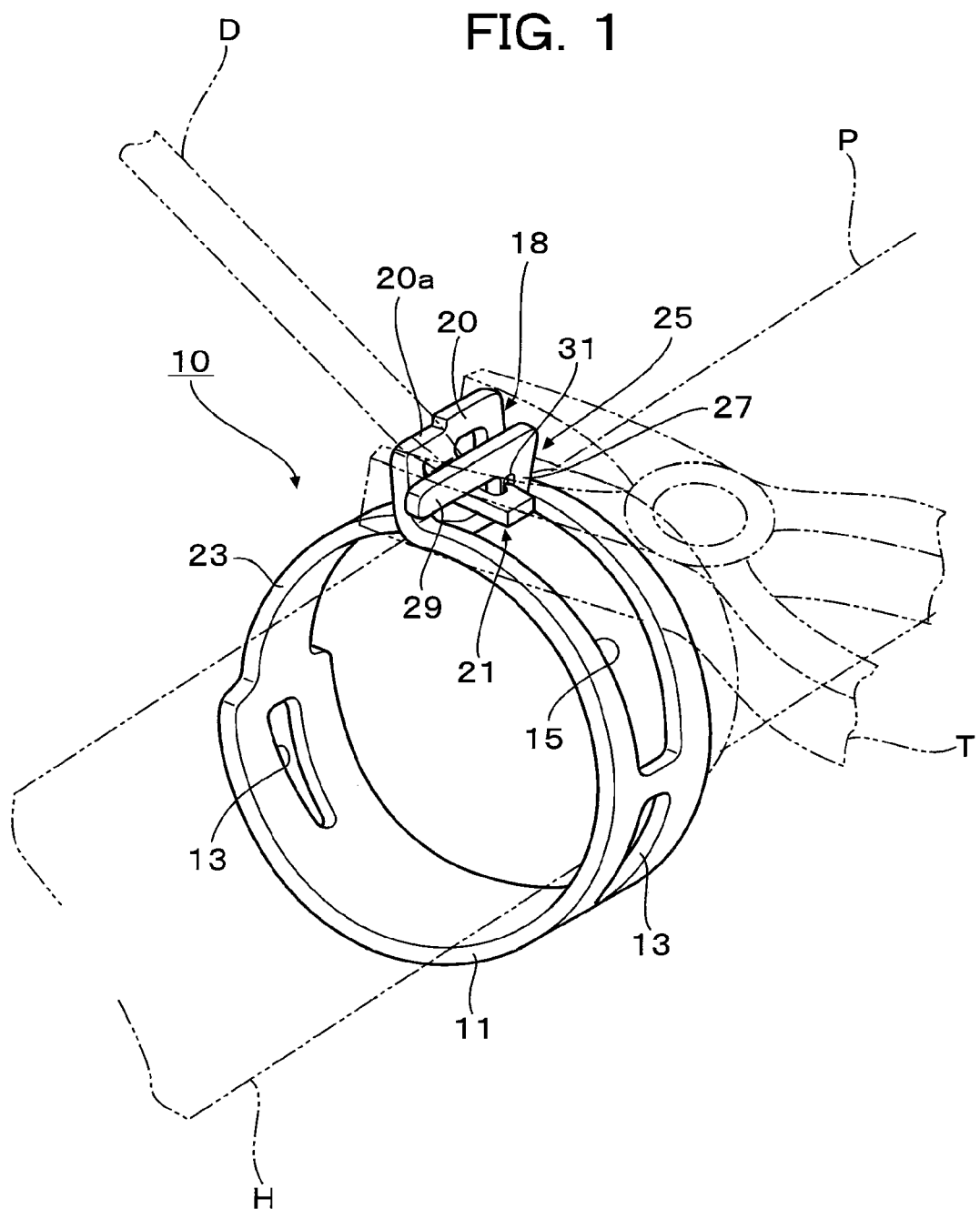
FIG. 1 is a perspective view of a hose clamp according to an embodiment of the present invention increased in diameter.

DESCRIPTION OF REFERENCE SYMBOLS 10 hose clamp (clamp)
11 plate spring body
15 slit
18 first tab
20a step portion
21 engagement section
23 insertion section
25 second tab
29 operation section
31 groove

BEST MODE FOR CARRYING OUT THE INVENTION

In the following, a hose clamp according to an embodiment of the present invention is described with reference to FIGS. 1 through 13.

Within an automobile, for example, there are arranged various types of piping. In order to connect pipes used in such piping, a flexible hose formed of a material such as rubber is adopted. As shown in FIGS. 1 through 4, a hose clamp 10 (herein after referred to as "the clamp 10") according to the present invention is arranged in the outer periphery of a hose H covering one end portion of a pipe P, and is utilized to tighten the outer periphery of the hose H to thereby fix the hose H to the pipe P.

Further, the clamp 10 has an annular plate spring body 11. At one end of the plate spring body 11, there are provided a circumferentially extending slit 15, and a first tab 18 bent at the forward end side of the slit 15 and protruding radially outwards. On the other hand, at the other end of the plate spring body 11, there are provided a narrow insertion section 23 to be inserted into the slit 15, and a second tab 25 formed by bending the forward end portion of the insertion section 23 and protruding radially outwards so as to be opposed to the first tab 18. In its free state, the plate spring body 11 is reduced in diameter, with the first tab 18 and the second tab 25 being spaced apart from each other in the circumferential direction (see FIG. 4), and when the first tab 18 and the second tab 25 are brought close to each other against the resilient force of the plate spring body 11, it is increased in diameter (see FIG. 1).

In the following, the above-mentioned parts are described in detail. The plate spring body 11 is formed by annularly curving a strip-like elastic metal plate. In the middle portion in the circumferential direction of the plate spring body 11, there are provided a plurality of slots 13, thereby making the stress distribution in the plate spring body 11 uniform.

Figure 9:
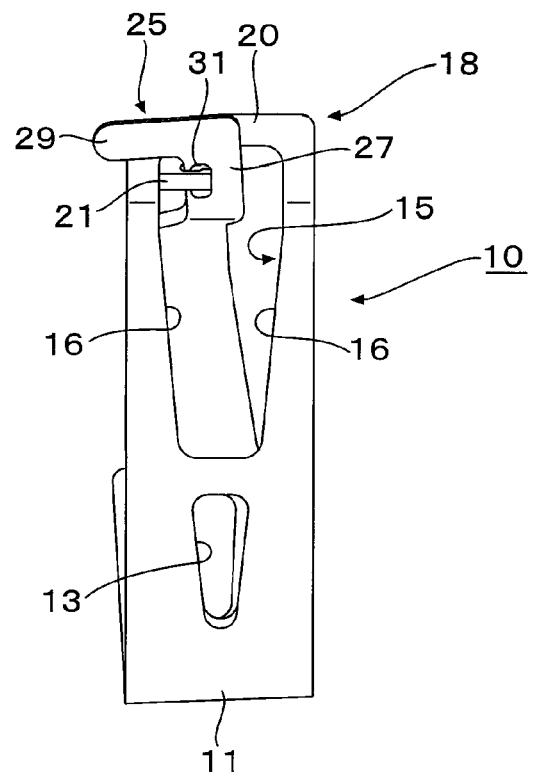
FIG. 9 is a right-hand side view of the hose clamp increased in diameter.
Figure 10:
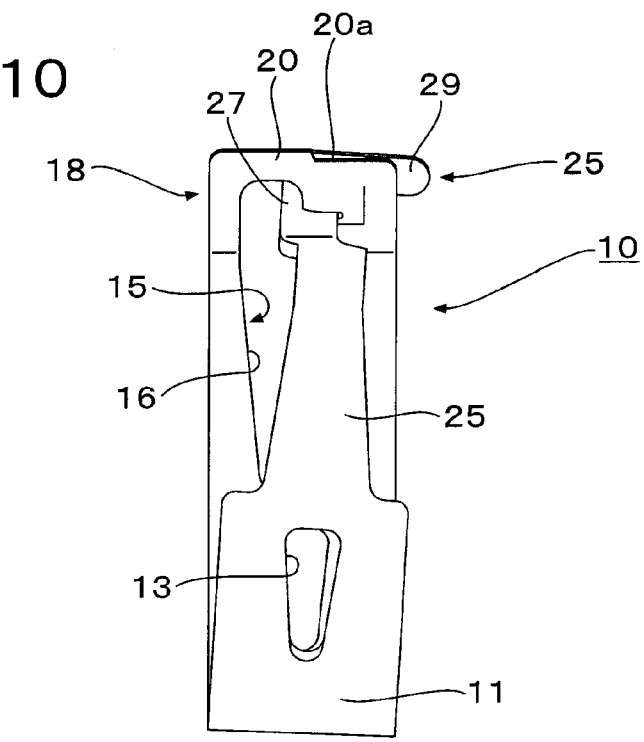
FIG. 10 is a left-hand side view of the hose clamp increased in diameter.
Figure 11:
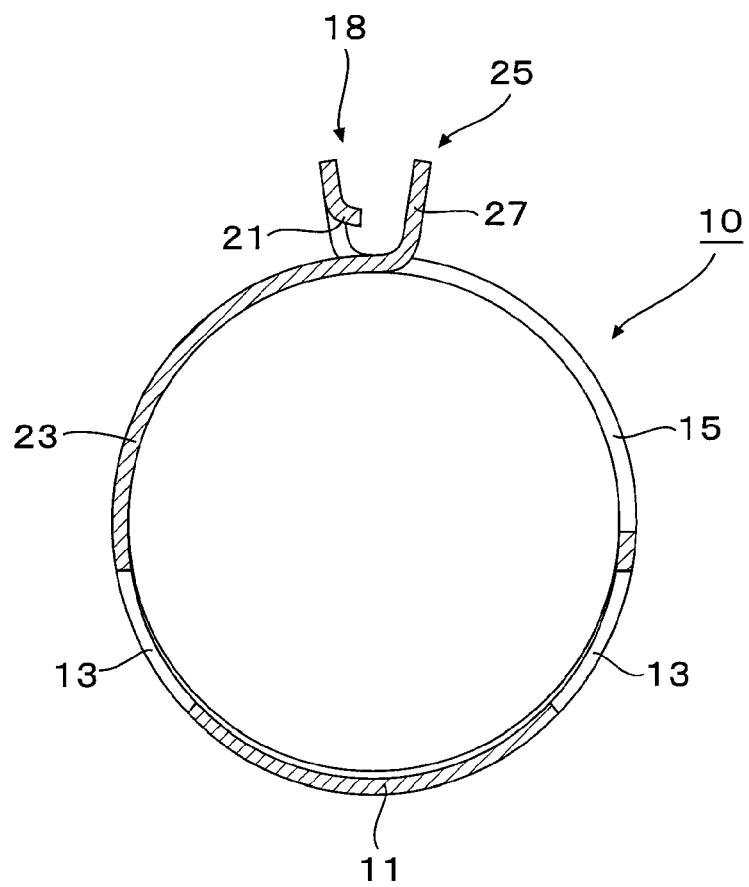
FIG. 11 is a sectional view taken along the arrow line Xi-XI of FIG. 7.

As described above, at one end portion of the plate spring body 11, the slit 15 of a predetermined length is formed to extend in the circumferential direction, and, at the forward end of the slit 15, one end portion is bent to protrude radially outwards, forming the above-mentioned first tab 18, which is of an arch-like configuration when seen in the circumferential direction. Referring to FIGS. 9 and 10, both side edges 16, 16 of the slit 15 are tapered so as to be gradually increased in width toward the forward end of the plate spring body 11, thus facilitating the insertion of the insertion section 23 constituting the other end portion of the plate spring body 11.

A hook-like engagement section 21 extends from the lower edge of an upper wall portion 20 of the arch-like first tab 18 toward the second tab 25 opposed thereto. That is, the engagement section 21 extends from the portion of the first tab 18 situated radially outside the outer circumference of the plate spring body 11. The engagement section 21 is described with reference to FIGS. 2, 4, and 7. The engagement section 21 includes a plate-like portion 21a extending from the lower end at one side in the width direction (the left-hand side in FIG. 2) of the upper wall portion 20 toward the second tab 25, an intermediate portion 21b extending from the forward end of the plate-like portion 21a, in the width direction of the plate spring body 11 and on the erect wall 27 side of the second tab 25 described below, and an engagement claw 21c protruding from the forward end of the intermediate portion 21b toward the first tab 25 and to be engaged with a groove 31 of the second tab 25 described below. Further, it is substantially J-shaped as seen in the radial direction.

Figure 4:
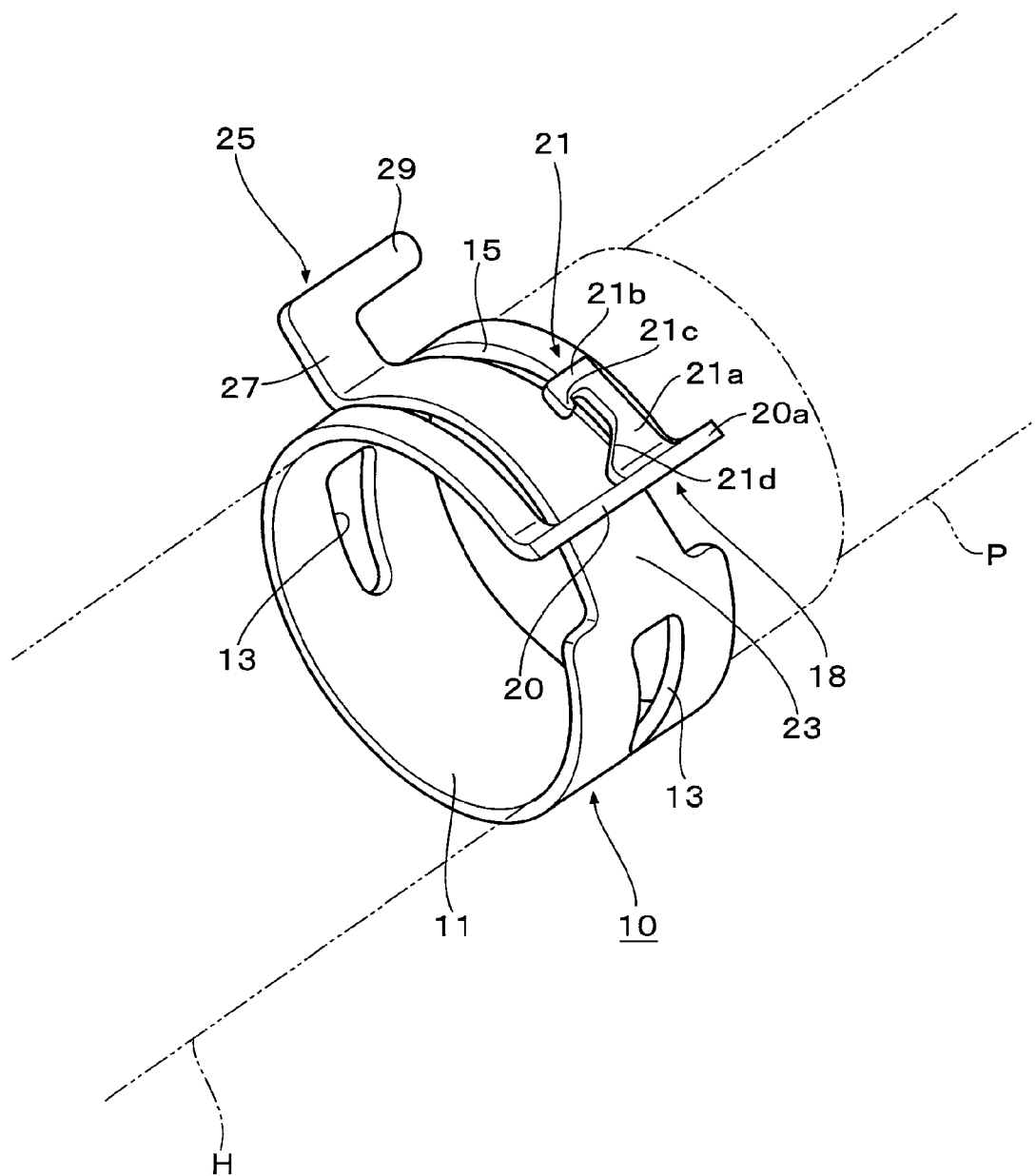
FIG. 4 is a perspective view of the hose clamp reduced in diameter.
Figure 5:
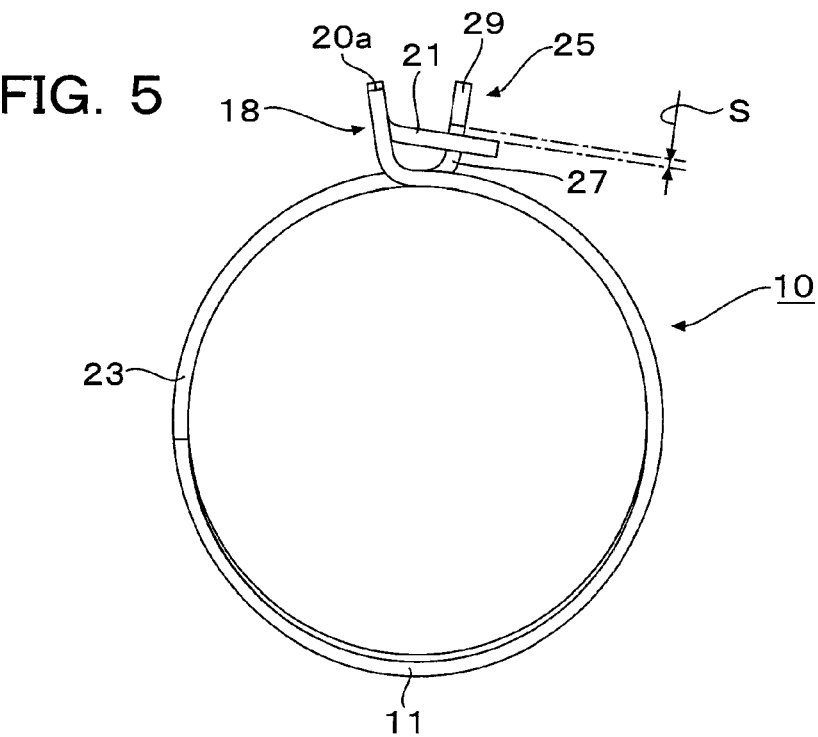
FIG. 5 is a front view of the hose clamp increased in diameter.
Figure 6:
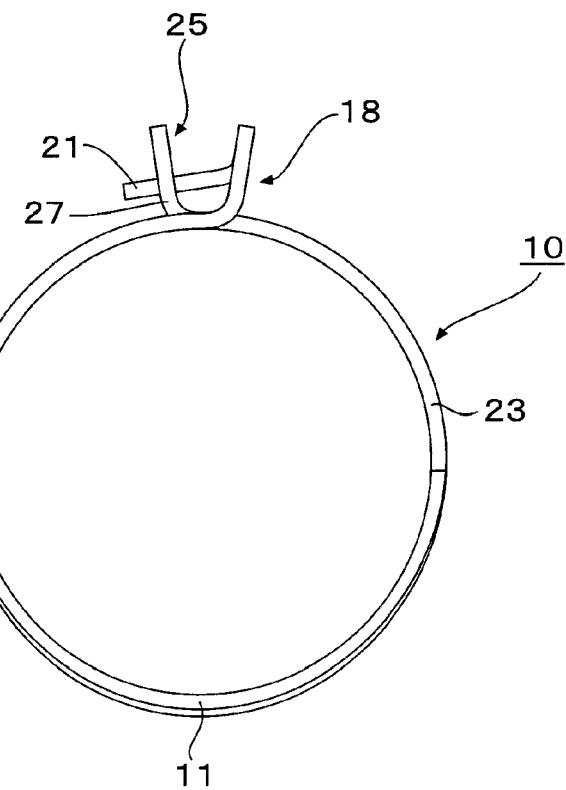
FIG. 6 is a rear view of the hose clamp increased in diameter.
Figure 7:
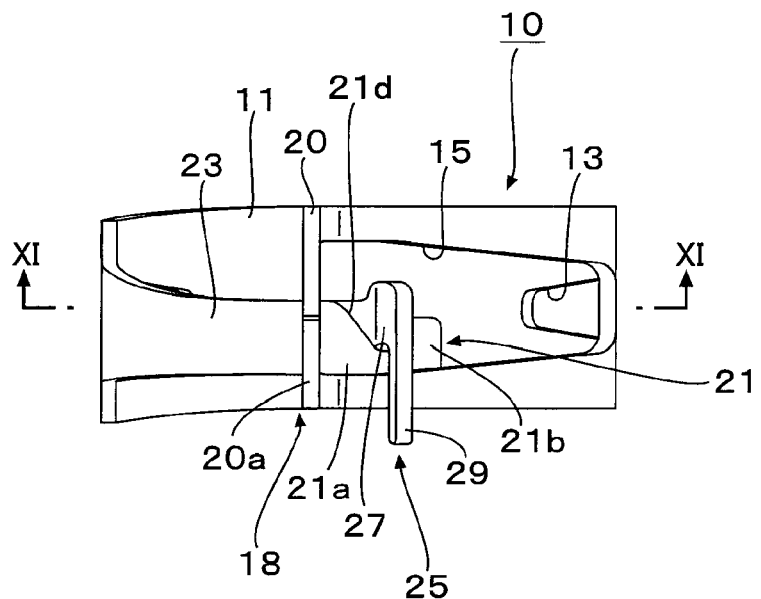
FIG. 7 is a plan view of the hose clamp increased in diameter.
Figure 8:
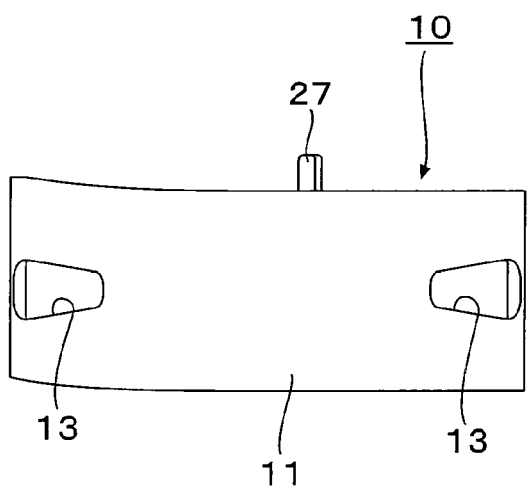
FIG. 8 is a bottom view of the hose clamp increased in diameter.
Figure 15:
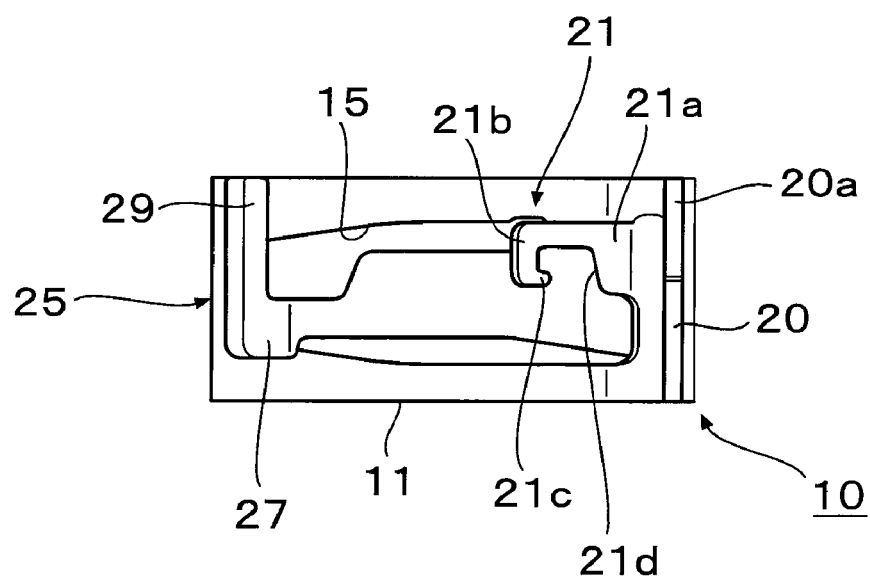
FIG. 15 is a plan view of the hose clamp decreased in diameter.

In the free state as shown in FIGS. 4 and 15, in which the plate spring body 11 is reduced in diameter, the engagement section 21 is deviated in the width direction with respect to the groove 31 of the second tab 25 described below, and it does not overlap the groove when it moves in the circumferential direction. Thus, to engage the engagement section 21 with the groove 31, the first tab 18 and the second tab 25 are brought close to each other, and both end portions of the plate spring body 11 are deflected in the width direction. Further, at a side portion close to the second tab 25, a tapered portion 21d is provided, which, formed to gradually increase the width of the plate-like portion 21a, extends toward the proximal portion side of the engagement section 21 from a substantially middle position in the extending direction of the plate-like portion 21a.

Further, in the upper edge portion of the upper wall portion 20 ("the protruding edge portion" in the present invention), there is formed a step portion 20a of a predetermined depth in correspondence with the arrangement position of the engagement section 21, which is from the middle position in the width direction over the end edge on the side where the engagement section 21 is arranged (the left-hand half in FIG. 2), and it serves as the portion on which the shaft portion of the flat head screwdriver D described below is to be placed.

On the other hand, as stated above, at the other end of the plate spring body 11, there is formed the insertion section 23 which is formed to be narrower than the slit 15, which is inserted into the slit 15, and which slides in the slit 15 in the circumferential direction when the plate spring body 11 is increased or reduced in diameter. At the end of the insertion section 23, there is formed the second tab 25 bent and protruding outwardly in the radial direction of the plate spring body 11, and the second tab 25 is opposed to the first tab 18. More specifically, the second tab 25 includes the erect wall 27 formed by bending the end portion of the insertion section 23 radially outwards, and an operation section 29 extending from the upper end portion of the erect wall 27 in the width direction of the plate spring body 11 so as to be situated over the engagement section 21 of the first tab 18.

Further, in the surface of the second tab 25 on the side opposite to the surface opposed to the first tab 18 (herein after referred to as "the outer surface of the second tab 25"), there is formed the groove 31 of a predetermined depth in the thickness direction of the second tab 25. The engagement claw 21c of the operation section 29 is engaged with the groove 31, and the engaged state is maintained. Accordingly, the groove 31 constitutes the stopper portion in the present invention.

Referring to FIGS. 1, 2, 7, and 8, in the case of this embodiment, in the state where the engagement section 21 is engaged with the groove 31 of the second tab 25 to increase the diameter of the plate spring body 11, the operation section 29 protrudes in the width direction of the plate spring body 11 beyond one end portion of the first tab 25. Further, in this state, between the upper surface of the engagement section 21 and the lower surface of the operation section 29, there is formed a gap S of a predetermined dimension (see FIG. 5).

Next, the procedures for fastening and fixing the hose H to the pipe P by using the clamp 10 constructed as described above are described.

First, in the free state shown in FIG. 4 in which the clamp is reduced in diameter, with the first tab 18 and the second tab 25 being spaced apart from each other, the first tab 18 and the second tab 25 are pinched in the circumferential direction by a tool such as pliers or the operator's hand against the restoring force of the plate spring body 11, causing the forward end of the engagement section 21 to protrude on the back surface side of the second tab 25. In this, in the free state where the plate spring body 11 is reduced in diameter, the engagement section 21 is deviated in the width direction with respect to the groove 31 of the second tab 25, and does not overlap the groove when it moves in the circumferential direction, which means no engagement occurs solely by bringing the first tab 18 and the second tab 25 close to each other in the circumferential direction, and hence, by further shifting the engagement section 21 of the first tab 18 in the width direction, it is possible to engage the engagement claw 21c with the groove 31 on the back side of the second tab 25. In this way, with both end portions of the plate spring body 11 being deflected in the width direction, the engagement claw 21c of the engagement section 21 is engaged with the groove 31, and the engaged state is maintained by the groove 31, the plate spring body 11 being increased in diameter as shown in FIGS. 1 and 2 and FIGS. 5 through 12.

Figure 3:
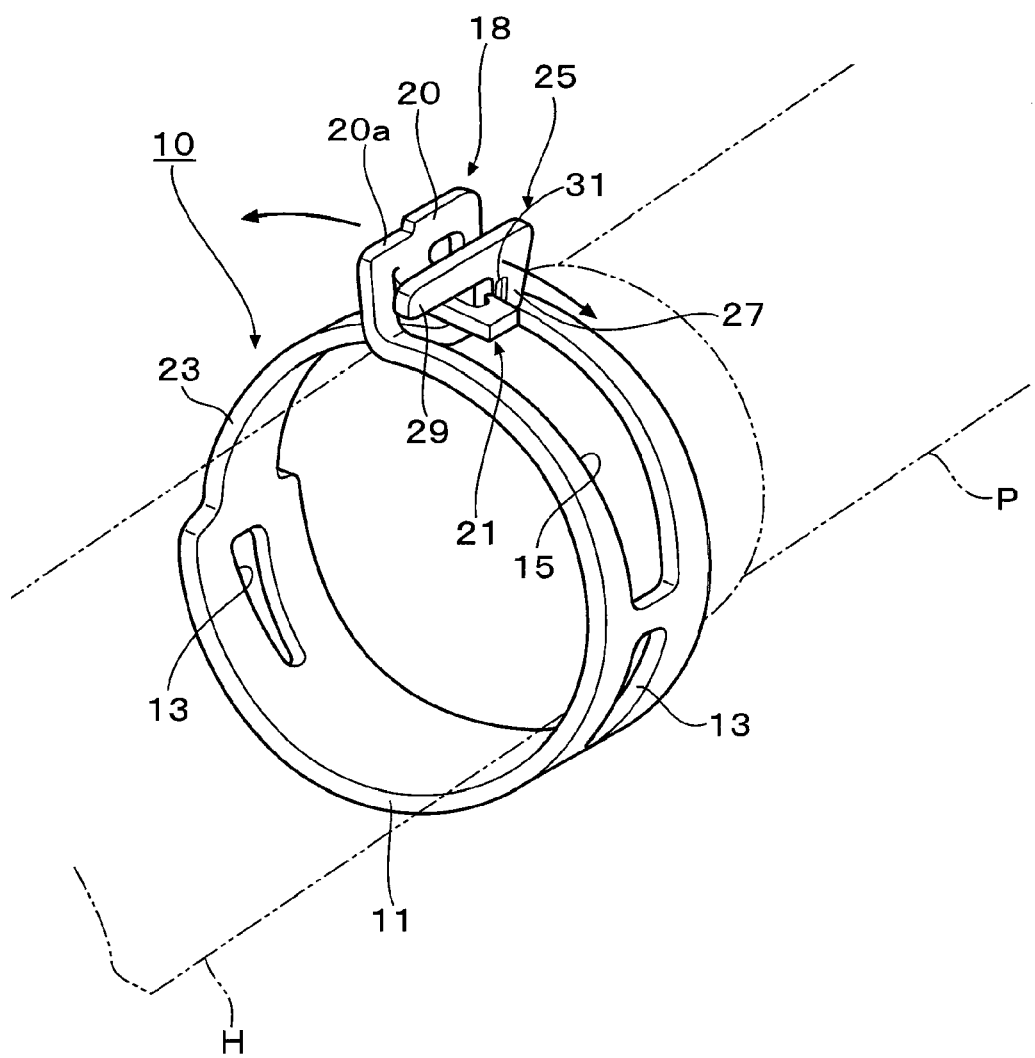
FIG. 3 is a perspective view of the hose clamp, with the engagement of the first and second tabs released.

In this state, the clamp 10 is arranged in the outer periphery of the hose H attached to the outer periphery of one end portion of the pipe P, and the engagement section 21 is shifted with respect to the second tab 25 to pull the engagement claw 21c out of the groove 31 to release the engagement. Then, both end portions of the plate spring body 11 are elastically restored to the former position in the width direction, and, as shown in FIG. 3, a state is attained in which the engagement section 21 and the second tab 25 are not engaged with each other. When the engagement of the engagement section 21 and the second tab 25 is thus released, the insertion section 23 slides in the slits 15 as indicated by the arrows in FIG. 3 so that the plate spring body 11, which has been deflected, may be restored to the former position by its own resilient restoring force, and the diameter of the plate spring body 11 is reduced, and hence it is possible to tighten the hose H to be fixed to the pipe P.

In this regard, in the present invention, it is possible to release the engagement of the engagement section 21 and the groove 31 in various ways as described below.

Figure 2:
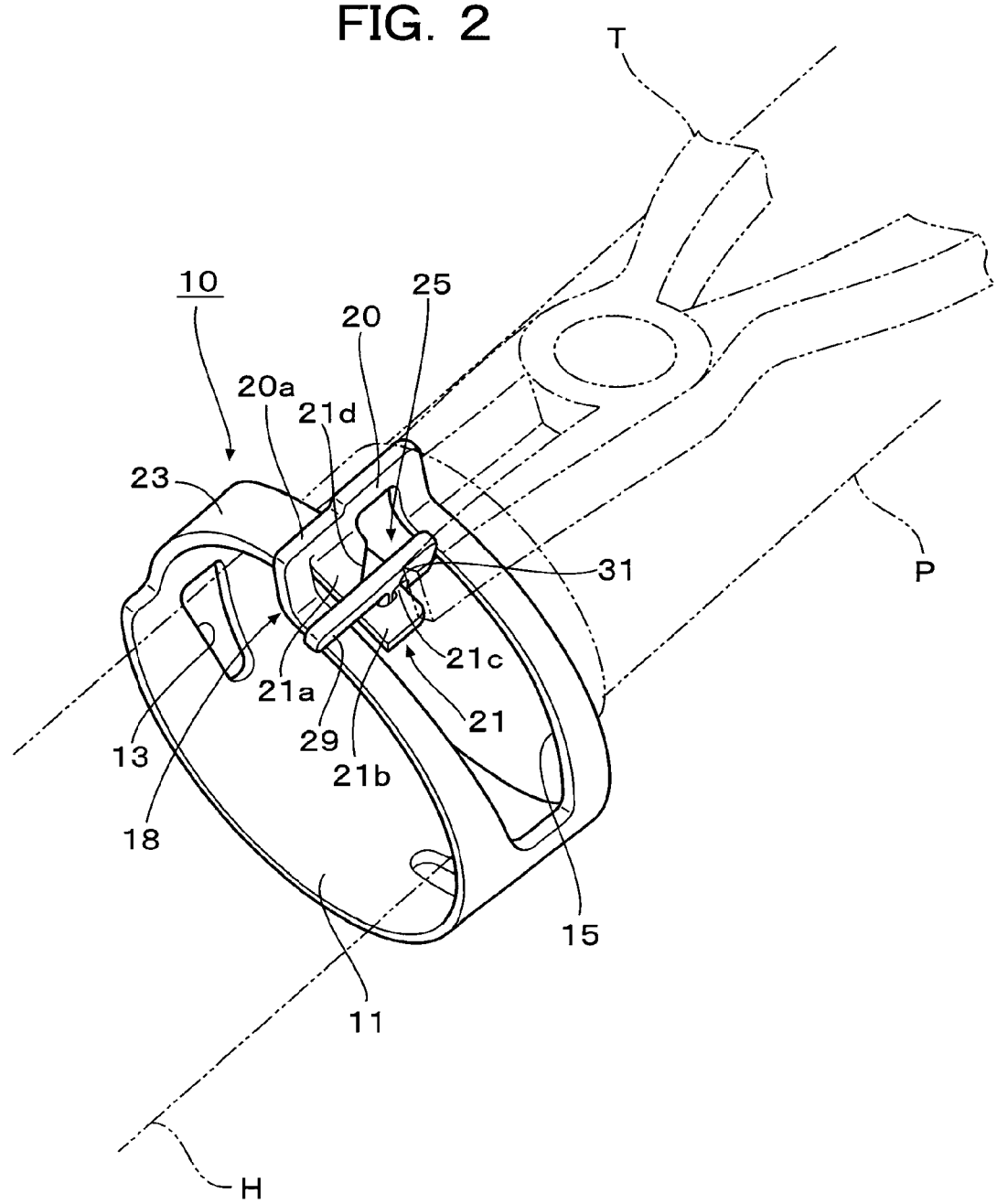
FIG. 2 is a perspective view of the hose clamp as increased in diameter, which is seen obliquely from above.
Figure 12:
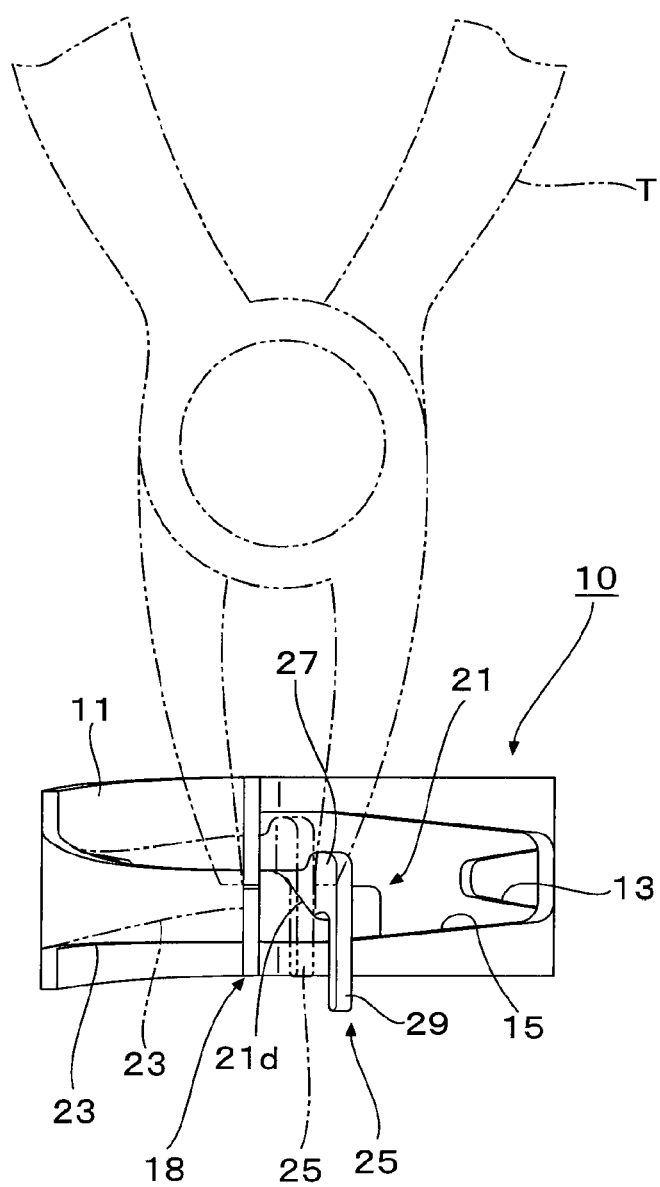
FIG. 12 is a plan view illustrating an example of a method of releasing the engagement of the first and second tabs of the hose clamp.

In a first method, as shown in FIGS. 2 and 12, the first tab 18 and the second tab 25 are pinched by pliers T and are brought close to each other in the circumferential direction. This causes the engagement claw 21c of the engagement section 21 to be raised and detached from the groove 31, and hence it is possible to release the engagement of the engagement section 21 and the groove 31. In this embodiment, the plate-like portion 21a of the engagement section 21 is provided with the tapered portion 21d as described above, and hence when the first tab 18 and the second tab 25 are brought close to each other in the circumferential direction, lateral shift in the width direction occurs, with the tapered portion 21d being held in sliding contact with the erect wall 27 of the second tab 25, making it possible to guide it to a position where it is adjacent to the side of the proximal portion of the engagement section as indicated by the imaginary lines in FIG. 12. After that, the pliers T are gradually opened to slowly reduce the diameter of the clamp 10, the engagement section 21 passes without engaging with the second tab 25 anymore, and the plate spring body 11 is reduced in diameter, making it possible to tighten the hose H. In this way, the clamp 10 can be slowly reduced in diameter, and hence it is possible to prevent, for example, deviation of the fastening position for the hose H due to an abrupt reduction in diameter.

Figure 13:
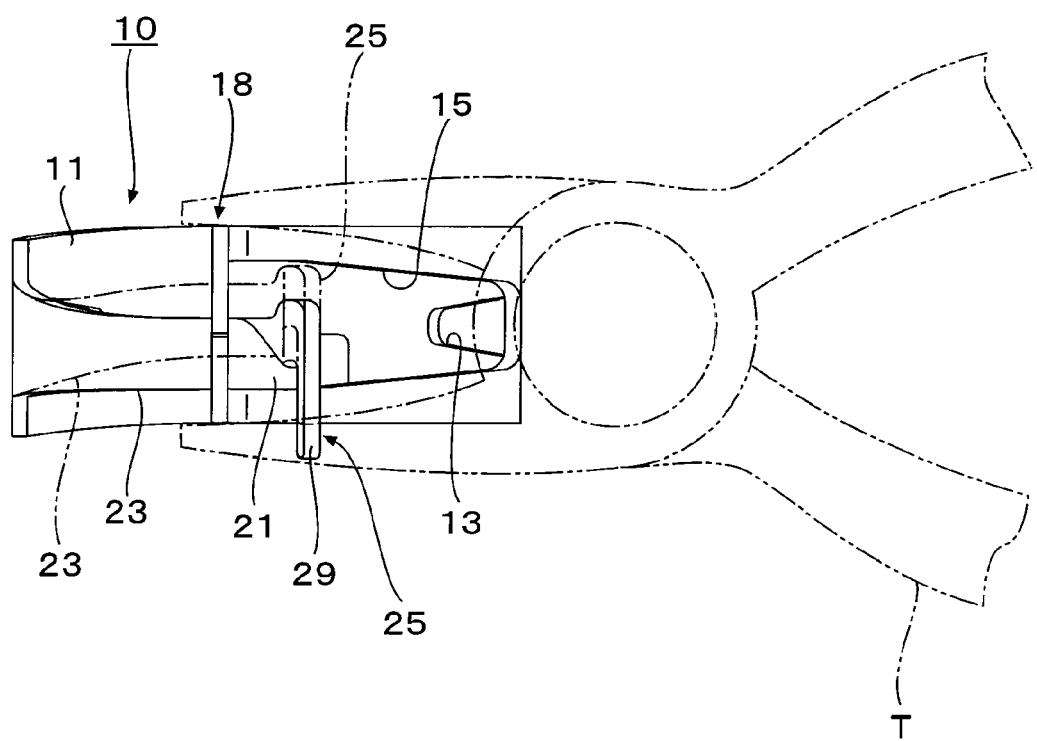
FIG. 13 is a plan view illustrating an example of a method of releasing the engagement of the first and second tabs of the hose clamp.

As shown in FIGS. 1 and 13, in a second method of releasing the engagement of the engagement section 21 and the groove 31, the end portion of the operation section 29 and the end portion of the first tab 18 on the side opposite to the end portion of the operation section 29 are pinched by pliers T, and the first tab 18 is shifted in the width direction with respect to the second tab 25. Also in this method, the engagement claw 21c is detached from the groove 31, and hence, as indicated by the imaginary lines in FIG. 13, it is possible to release the engagement of the engagement section 21 and the groove 31. Further, in this embodiment, the operation section 29 protrudes in the width direction beyond the first tab 25, with the engagement claw 21c being engaged with the groove 31, and hence the engagement of the engagement section 21 and the groove 31 can be smoothly released through easy pinching with the pliers T.

As shown in FIG. 1, in a third method of releasing the engagement of the engagement section 21 and the groove 31, the tapered forward end of the flat head screwdriver D is inserted into the gap S between the upper surface of the engagement section 21 and the lower surface of the operation section 29, and, at the same time, the shaft portion thereof is placed on the step portion 20a of the upper wall portion 20 of the first tab 18, and, using this portion as a fulcrum, the operation section 29 is pushed up or the engagement section 21 is pushed down. In this method, the engagement section 21 and the operation section 29 are vertically spaced apart from each other, and hence it is possible to release the engagement of the engagement section 21 and the groove 31 by detaching the engagement claw 21c from the groove 31. In this way, the engagement of the engagement section 21 and the groove 31 is released by the principles of the lever using the flat head screwdriver D, and hence the engagement can be released easily with a relatively small force. Further, it is possible to reliably make positioning on the shaft portion of the flat head screwdriver D with respect to the step portion 20a, and hence the engagement of the engagement section 21 and the groove 31 can be released in a stable and efficient manner.

As described above, in the clamp 10 of the present invention, it is possible to release the engagement of the engagement section 21 and the groove 31 by the various methods as described above, and hence, even when the space and direction in which the operator's hand or the tool can be inserted are limited due to the conditions in circumstance in which the clamp 10 is arranged, such as the layout of the hose H and the pipe P, it is possible to reliably release the engagement of the engagement section 21 and the groove 31, thus facilitating the fastening operation for the hose H.

Further, in this embodiment, the groove 31 to be engaged with the engagement claw 21c is provided on the back side of the second tab 25, and hence, in whatever direction the engagement section 21 may be shifted with respect to the second tab 25, it is possible to release the engagement of the engagement section 21 and the groove 31, whereby the operating direction can be diversified.

Further, in this embodiment, the engagement section 21 extends from a position on the first tab 18 on the radially outer side of the outer circumference of the plate spring body 11, and hence it is possible to tighten the hose H, with the inner circumference of the plate spring body 11 being firmly held in intimate contact with the entire periphery of the hose H, making it possible to achieve an improvement in performance such as the sealing property for the pipe P and the hose H.

Figure 14:
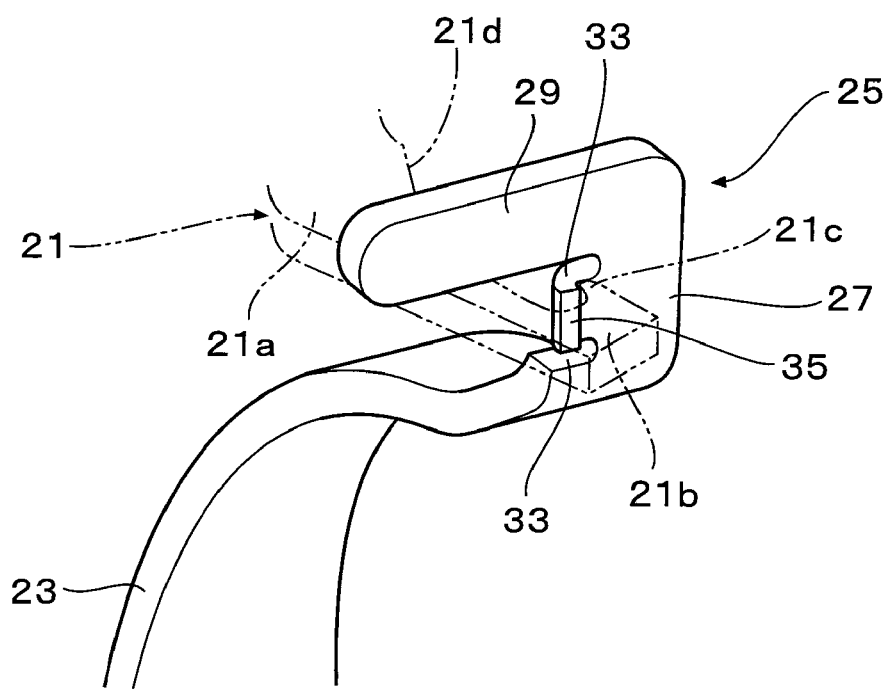
FIG. 14 is a main portion enlarged perspective view of a hose clamp according to another embodiment.

FIG. 14 shows a clamp according to another embodiment of the present invention. The portions that are substantially the same as those of the above-mentioned embodiment are indicated by the same reference symbols, and a description thereof is omitted.

In this embodiment, the configuration of the stopper portion, which is to be engaged with the engagement claw 21c and maintains the engaged state, differs from that of the above-mentioned embodiment.

Specifically, in this embodiment, at the upper and lower two portions of one side edge of the erect wall 27 included in the second tab 25, there are formed a pair of slits 33, 33 extending in the width direction, and, the portion between the slits 33, 33 is bent in the direction not opposed to the first tab 18 to provide a presser claw 35.

As indicated by the imaginary lines of FIG. 14, the engagement claw 21c of the engagement section 21 is engaged with the presser claw 35 to maintain the plate spring body 11 in the increased-in-diameter state. Also in the case of the stopper portion formed by the presser claw 35, the engagement of the presser claw 35 and the engagement claw 21c is released by shifting the engagement claw 21c of the engagement section 21 horizontally or vertically, whereby the plate spring body 11 can be reduced in diameter.

The invention claimed is:

1. A hose clamp comprising a plate spring body curved into an annular configuration, wherein:
a first end portion of the plate spring body comprises a slit extending in a circumferential direction, and a first tab protruding radially outwards,
a second end portion of the plate spring body comprises an insertion section which is insertable into the slit and slidable within the slit in the circumferential direction, and a second tab protruding radially outwards from an end portion of the insertion section and arranged to be opposed to the first tab,
the plate spring body is increased in diameter against a resilient force thereof when the first tab and the second tab are brought close to each other, and the plate spring body is reduced in diameter in a free state,
the first tab comprises a hook-like engagement section extending toward the second tab and extending in a width direction of the plate spring body, the hook-like engagement section being engagable with a surface of the second tab on a side opposite to a surface opposed to the first tab,
the second tab comprises an operation section extending in the width direction of the plate spring body for a predetermined length so as to be situated above the engagement section, and a stopper portion which, when the engagement section is engaged with the surface of the second tab on the side opposite to the surface opposed to the first tab, maintains an engaged state therebetween,
in the free state in which the plate spring body is reduced in diameter, the engagement section is situated to be deviated in the width direction with respect to the stopper portion and is thereby free from overlapping the stopper portion when viewed in the circumferential direction, and
when the engagement section is engaged with the second tab, a gap into which a thin and narrow distal end of a tool is insertable is formed between an upper surface of the engagement section and a lower surface of the operation section.

2. A hose clamp comprising a plate spring body curved into an annular configuration, wherein:
a first end portion of the plate spring body comprises a slit extending in a circumferential direction, and a first tab protruding radially outwards,
a second end portion of the plate spring body comprises an insertion section which is insertable into the slit and slidable within the slit in the circumferential direction, and a second tab protruding radially outwards from an end portion of the insertion section and arranged to be opposed to the first tab,
the plate spring body is increased in diameter against a resilient force thereof when the first tab and the second tab are brought close to each other, and the plate spring body is reduced in diameter in a free state,
the first tab comprises a hook-like engagement section extending toward the second tab and extending in a width direction of the plate spring body, the hook-like engagement section being engagable with a surface of the second tab on a side opposite to a surface opposed to the first tab,
the second tab comprises an operation section extending in the width direction of the plate spring body for a predetermined length so as to be situated above the engagement section, and a stopper portion which, when the engagement section is engaged with the surface of the second tab on the side opposite to the surface opposed to the first tab, maintains an engaged state therebetween,
in the free state in which the plate spring body is reduced in diameter, the engagement section is situated to be deviated in the width direction with respect to the stopper portion and is thereby free from overlapping the stopper portion when viewed in the circumferential direction, and
when the engagement section is engaged with the stopper portion of the second tab, the operation section protrudes in the width direction of the plate spring body beyond the first tab.

3. A hose clamp comprising a plate spring body curved into an annular configuration, wherein:
a first end portion of the plate spring body comprises a slit extending in a circumferential direction, and a first tab protruding radially outwards,
a second end portion of the plate spring body comprises an insertion section which is insertable into the slit and slidable within the slit in the circumferential direction, and a second tab protruding radially outwards from an end portion of the insertion section and arranged to be opposed to the first tab,
the plate spring body is increased in diameter against a resilient force thereof when the first tab and the second tab are brought close to each other, and the plate spring body is reduced in diameter in a free state,
the first tab comprises a hook-like engagement section extending toward the second tab and extending in a width direction of the plate spring body, the hook-like engagement section being engagable with a surface of the second tab on a side opposite to a surface opposed to the first tab,
the second tab comprises an operation section extending in the width direction of the plate spring body for a predetermined length so as to be situated above the engagement section, and a stopper portion which, when the engagement section is engaged with the surface of the second tab on the side opposite to the surface opposed to the first tab, maintains an engaged state therebetween,
in the free state in which the plate spring body is reduced in diameter, the engagement section is situated to be deviated in the width direction with respect to the stopper portion and is thereby free from overlapping the stopper portion when viewed in the circumferential direction,
a tapered portion is provided on a side portion of the engagement section in closer proximity to the second tab than a position at which the engagement section is engaging with the second tab, the tapered portion gradually increasing a width of the engagement section in an extending direction of the engagement section toward a proximal portion side thereof, and
the engagement section extends from a portion of the first tab situated radially outside an outer circumference of the plate spring body.

4. A hose clamp comprising a plate spring body curved into an annular configuration, wherein:
a first end portion of the plate spring body comprises a slit extending in a circumferential direction, and a first tab protruding radially outwards,
a second end portion of the plate spring body comprises an insertion section which is insertable into the slit and slidable within the slit in the circumferential direction, and a second tab protruding radially outwards from an end portion of the insertion section and arranged to be opposed to the first tab, the plate spring body is increased in diameter against a resilient force thereof when the first tab and the second tab are brought close to each other, and the plate spring body is reduced in diameter in a free state, the first tab comprises a hook-like engagement section extending toward the second tab and extending in a width direction of the plate spring body, the hook-like engagement section being engagable with a surface of the second tab on a side opposite to a surface opposed to the first tab, the second tab comprises an operation section extending in the width direction of the plate spring body for a predetermined length so as to be situated above the engagement section, and a stopper portion which, when the engagement section is engaged with the surface of the second tab on the side opposite to the surface opposed to the first tab, maintains an engaged state therebetween, in the free state in which the plate spring body is reduced in diameter, the engagement section is situated to be deviated in the width direction with respect to the stopper portion and is thereby free from overlapping the stopper portion when viewed in the circumferential direction, when the engagement section is engaged with the second tab, a gap into which a thin and narrow distal end of a tool is insertable is formed between an upper surface of the engagement section and a lower surface of the operation section, a tapered portion is provided on a side portion of the engagement section in closer proximity to the second tab than a position at which the engagement section is engaging with the second tab, the tapered portion gradually increasing a width of the engagement section in an extending direction of the engagement section toward a proximal portion side thereof, and when the engagement section is engaged with the stopper portion of the second tab, the operation section protrudes in the width direction of the plate spring body beyond the first tab.

5. A hose clamp comprising a plate spring body curved into an annular configuration, wherein:

a first end portion of the plate spring body comprises a slit extending in a circumferential direction, and a first tab protruding radially outwards, a second end portion of the plate spring body comprises an insertion section which is insertable into the slit and slidable within the slit in the circumferential direction, and a second tab protruding radially outwards from an end portion of the insertion section and arranged to be opposed to the first tab, the plate spring body is increased in diameter against a resilient force thereof when the first tab and the second tab are brought close to each other, and the plate spring body is reduced in diameter in a free state, the first tab comprises a hook-like engagement section extending toward the second tab and extending in a width direction of the plate spring body, the hook-like engagement section being engagable with a surface of the second tab on a side opposite to a surface opposed to the first tab, the second tab comprises an operation section extending in the width direction of the plate spring body for a predetermined length so as to be situated above the engagement section, and a stopper portion which, when the engagement section is engaged with the surface of the second tab on the side opposite to the surface opposed to the first tab, maintains an engaged state therebetween, in the free state in which the plate spring body is reduced in diameter, the engagement section is situated to be deviated in the width direction with respect to the stopper portion and is thereby free from overlapping the stopper portion when viewed in the circumferential direction, when the engagement section is engaged with the second tab, a gap into which a thin and narrow distal end of a tool is insertable is formed between the upper surface of the engagement section and the lower surface of the operation section, a tapered portion is provided on a side portion of the engagement section in closer proximity to the second tab than a position at which the engagement section is engaging with the second tab, the tapered portion gradually increasing a width of the engagement section in an extending direction of the engagement section toward a proximal portion side thereof, and wherein the engagement section extends from a portion of the first tab situated radially outside an outer circumference of the plate spring body.

6. The hose clamp according to claim 1, wherein a part of the first tab, in a protruding edge portion, forms a step portion of a predetermined depth, the step portion extending in the width direction of the plate spring body.

7. The hose clamp according to claim 1, wherein the stopper portion comprises a groove formed to a predetermined depth in a thickness direction of the second tab in the surface of the second tab on the side opposite to the surface opposed to the first tab, and wherein a forward end portion of the engagement section is insertable into the groove to engage therewith.

8. The hose clamp according to claim 1, wherein the stopper portion comprises a presser claw formed by forming a pair of slits extending in the width direction respectively at upper and lower positions of one side edge of an erect wall included in the second tab and by bending a wall portion between the slits in a direction where the wall portion is not opposed to the first tab, such that the forward end portion of the engagement section is engaged with the presser claw.

9. The hose clamp according to claim 2, wherein a part of the first tab, in a protruding edge portion, forms a step portion of a predetermined depth, the step portion extending in the width direction of the plate spring body.

10. The hose clamp according to claim 3, wherein a part of the first tab, in a protruding edge portion, forms a step portion of a predetermined depth, the step portion extending in the width direction of the plate spring body.

11. The hose clamp according to claim 4, wherein a part of the first tab, in a protruding edge portion, forms a step portion of a predetermined depth, the step portion extending in the width direction of the plate spring body.

12. The hose clamp according to claim 5, wherein a part of the first tab, in a protruding edge portion, forms a step portion of a predetermined depth, the step portion extending in the width direction of the plate spring body.

13. The hose clamp according to claim 2, wherein the stopper portion comprises a groove formed to a predetermined depth in a thickness direction of the second tab in the surface of the second tab on the side opposite to the surface opposed to the first tab, and wherein a forward end portion of the engagement section is insertable into the groove to engage therewith.

14. The hose clamp according to claim 3, wherein the stopper portion comprises a groove formed to a predetermined depth in a thickness direction of the second tab in the surface of the second tab on the side opposite to the surface opposed to the first tab, and wherein a forward end portion of the engagement section is insertable into the groove to engage therewith.

15. The hose clamp according to claim 4, wherein the stopper portion comprises a groove formed to a predetermined depth in a thickness direction of the second tab in the surface of the second tab on the side opposite to the surface opposed to the first tab, and
wherein a forward end portion of the engagement section is insertable into the groove to engage therewith.

16. hose clamp according to claim 5, wherein the stopper portion comprises a groove formed to a predetermined depth in a thickness direction of the second tab in the surface of the second tab on the side opposite to the surface opposed to the first tab, and
wherein a forward end portion of the engagement section is insertable into the groove to engage therewith.

17. The hose clamp according to claim 2, wherein the stopper portion comprises a presser claw formed by forming a pair of slits extending in the width direction respectively at upper and lower positions of one side edge of an erect wall included in the second tab and by bending a wall portion between the slits in a direction where the wall portion is not opposed to the first tab, such that the forward end portion of the engagement section is engaged with the presser claw.

18. The hose clamp according to claim 3, wherein the stopper portion comprises a presser claw formed by forming a pair of slits extending in the width direction respectively at upper and lower positions of one side edge of an erect wall included in the second tab and by bending a wall portion between the slits in a direction where the wall portion is not opposed to the first tab, such that the forward end portion of the engagement section is engaged with the presser claw.

19. The hose clamp according to claim 4, wherein the stopper portion comprises a presser claw formed by forming a pair of slits extending in the width direction respectively at upper and lower positions of one side edge of an erect wall included in the second tab and by bending a wall portion between the slits in a direction where the wall portion is not opposed to the first tab, such that the forward end portion of the engagement section is engaged with the presser claw.

20. The hose clamp according to claim 5, wherein the stopper portion comprises a presser claw formed by forming a pair of slits extending in the width direction respectively at upper and lower positions of one side edge of an erect wall included in the second tab and by bending a wall portion between the slits in a direction where the wall portion is not opposed to the first tab, such that the forward end portion of the engagement section is engaged with the presser claw.

* * * * *